(12) United States Patent
Hawtof et al.

(10) Patent No.: US 6,739,156 B1
(45) Date of Patent: May 25, 2004

(54) MAINTAINING A PLUG-FREE SYSTEM DURING A SILICA SOOT CREATION PROCESS

(75) Inventors: Daniel W. Hawtof, Painted Post, NY (US); John Stone, III, Painted Post, NY (US); Joseph M. Whalen, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/762,274

(22) PCT Filed: Jul. 16, 1999

(86) PCT No.: PCT/US99/16176
§ 371 (c)(1),
(2), (4) Date: Feb. 1, 2001

(87) PCT Pub. No.: WO00/07950
PCT Pub. Date: Feb. 17, 2000

Related U.S. Application Data

(60) Provisional application No. 60/095,735, filed on Aug. 7, 1998.

(51) Int. Cl.$^7$ .............................................. C03B 31/014
(52) U.S. Cl. ............................. 65/413; 65/414; 65/415; 65/416; 65/17.4; 65/27
(58) Field of Search .......................... 65/413, 414, 415, 65/416, 17.4, 27

(56) References Cited

U.S. PATENT DOCUMENTS

| | | | |
|---|---|---|---|
| 4,136,828 A | * | 1/1979 | Anderson et al. ........... 239/422 |
| 4,230,744 A | | 10/1980 | Blankenship |
| 4,292,290 A | * | 9/1981 | Tunison, III ................ 423/336 |
| 4,999,213 A | * | 3/1991 | Meyer ......................... 427/485 |
| 5,810,254 A | * | 9/1998 | Kropfield ..................... 239/61 |
| 5,979,185 A | * | 11/1999 | Blackwell et al. ........... 65/17.4 |
| 6,116,260 A | * | 9/2000 | Nakagawa et al. ........... 137/14 |
| 6,546,757 B1 | * | 4/2003 | Morse ......................... 65/377 |

OTHER PUBLICATIONS

Grant & Hackh's Chemical Dictionary, 1991, pp. 531 and 24, 5th Edition.*
Grant & Hackh's Chemical Dictionary, 1991, pp. 531 and 24.*

* cited by examiner

*Primary Examiner*—John Hoffmann
(74) *Attorney, Agent, or Firm*—Timothy R. Krogh; Kevin M. Able

(57) ABSTRACT

The present invention is directed to a system and method for delivering liquid reactants through a burner assembly to form soot used in the manufacture of glass, and in particular, optical waveguides. Due to the tendency of liquid reactants to react to form solids when exposed to water in the air, an evaporative liquid is first delivered through the burner assembly to the combustion zone. Once steady state liquid flow has been achieved in the system, the evaporative liquid is transitioned to the liquid reactant. The liquid reactant is delivered along the same path to the burner assembly, which discharges the liquid reactant into the combustion zone as an atomized liquid to form soot used in the manufacture of glass. Once the desired quantity of soot has been formed, the liquid reactant is transitioned back to the evaporative liquid while maintaining steady state flow. After the liquid reactant has cleared the system, flow of the evaporative liquid is terminated and the burner assembly flame turned off. Because the evaporative liquid is the last liquid to leave the burner assembly, no reactants are present to form solids and the burner assembly remains plug free. Preferably, the liquid reactants are housed within a dry environment to provide a reaction free area for staging the liquid reactants prior to delivery, thus facilitating and expediting multiple system runs with different liquid reactants.

19 Claims, 2 Drawing Sheets

MAINTAINING A PLUG-FREE SYSTEM DURING A SILICA SOOT CREATION PROCESS

This application claims benefit of priority under 35 U.S.C. § 365 of International Patent Application Serial No. PCT/US99/16176 filed on Jul. 16, 1999 designating the United States of America, which in turn claims the benefit of priority of U.S. Provisional Application Serial No. 60/095,735 filed Aug. 7, 1998.

FIELD OF THE INVENTION

The present invention relates to the delivery of liquid reactants to a combustion zone formed adjacent a burner assembly to create soot used in the manufacture of glass. More particularly, the present invention relates to a system and method of delivering liquid reactants to a combustion zone that avoids the premature solidification of the liquid reactants within the burner assembly.

While the invention is subject to a wide range of glass soot deposition applications, it is especially suited for use in producing soot for glass preforms used in the manufacture of optical waveguides, and will be particularly described in that connection.

BACKGROUND OF THE INVENTION

Various processes are known in the art that involve the production of metal oxides from vaporous reactants. Such processes require a feedstock solution or precursor, a means of generating and transporting vapors of the feedstock solution (hereafter called vaporous reactants) and an oxidant to a conversion reaction site (also known as a soot reaction zone or combustion zone to those skilled in the art), and a means of catalyzing oxidation and combustion coincidentally to produce finely divided, spherical aggregates, called soot. This soot can be collected in any number of ways, ranging from capture in a collection chamber to deposition on a rotating mandrel. The collected soot may be simultaneously or subsequently heat treated to form a non-porous, transparent, high purity glass article. This process is usually carried out with specialized equipment having a unique arrangement of nozzles, injectors, burners and/or burner assemblies.

Much of the initial research that led to the development of such processes focused on the production of bulk silica. Selection of the appropriate feedstock was an important aspect of that work. Consequently, it was at that time determined that a material capable of generating a vapor pressure of between 200–300 millimeters of mercury (mm Hg) at temperatures below approximately 100° C. would be useful for making such bulk silica. The high vapor pressure of silicon tetrachloride ($SiCl_4$) suggested its usefulness as a convenient vapor source for soot generation and launched the discovery and use of a series of similar chloride-based feedstocks. This factor, more than any other is responsible for the presently accepted use of $SiCl_4$, $GeCl_4$, $POCl_3$, and $BCl_3$ as feedstock vapor sources.

Use of these and other halide-based feedstocks as vapor sources, however, does have its drawbacks. The predominate drawback being the formation of hydrochloric acid (HCl) as a by-product of oxidation. HCl is not only detrimental to the deposition substrates and the reaction equipment, but to the environment as well. Overcoming this drawback, amongst others, led to the use of halide-free compounds as precursors or feedstocks for the production of soot for optical waveguides.

Although use of halide-free silicon compounds as feedstocks for fused silica glass production, as described in U.S. Pat. Nos. 5,043,002 and 5,152,819, for example, avoids the formation of HCl, other problems remain, particularly when the soot is intended for the formation of optical waveguides. It has been found that, in the course of delivering a vaporized polyalkylsiloxane to the burner, high molecular weight species can be deposited as gels in the lines carrying the vaporous reactants to the burner, or within the burner itself. This leads to a reduction in the deposition rate of the soot that is subsequently consolidated to a blank from which an optical waveguide fiber is drawn. It also leads to imperfections in the blank that often produce defective and/or unusable optical waveguide fiber from the effected portions of the blank. An additional problem encountered while forming silica soot using siloxane feedstocks is the deposition of particulates having high molecular weights and high boiling points on the optical waveguide fiber blank. The build-up of these particulates results in "defect" or "clustered defect" imperfections that adversely affect the optical and structural quality of optical waveguides formed using the silica soot.

Other feedstocks, some of which are, and others of which may be useful in forming soot for the manufacture of optical waveguides are not currently acceptable alternatives to the halide-based and halide-free feedstocks for delivery via vapor deposition. Materials such as salts and those known as rare-earth elements, for example, are extremely unstable as vapors and often decompose before they can be delivered in their vapor phase, or do not have sufficiently high vapor pressures to be vaporized at accessible temperatures.

Although it is often possible to deliver at least a percentage of these elements to the combustion zone as a vapor, it is technically very difficult. Elaborate systems incorporating expensive equipment are necessary to convert these elements to the vapor phase, and further, to deliver them to the combustion zone without leaving deposits in the lines leading to the burners and in the burners themselves. Moreover, if multiple elements are being delivered as vapors and a specific percentage of each is needed for the desired composition, it is difficult to control the delivery since different elements have different vapor pressures.

U.S. patent application Ser. No. 08/767,653, discloses that these and other limitations can be overcome by delivering a feedstock to an injector or burner in liquid form, atomizing the feedstock to form an aerosol containing fine droplets of the liquid feedstock, and converting the atomized liquid feedstock into soot at the combustion zone. Because the feedstock is delivered directly into the burner flame as a liquid rather than a vapor, the vapor pressure of tie feedstock is no longer a limiting factor in the formation of soot for use in the manufacture of optical waveguides The injectors, burners, and burner assemblies disclosed in U.S. patent application Ser. No. 08/767,653 and other currently pending applications rely on very small orifices to deliver the liquid in a fine stream for proper atomization. Because the orifices are so small, they are extremely susceptible to plugging. Even a small solid particle in the liquid being delivered can partially clog the orifice, which in turn adversely effects the soot deposition rate, and the homogeneity of the soot collected.

Although materials never before delivered to a combustion zone to form soot for the manufacture of glass can now be delivered in a liquid solution, many of these materials have inherent short-comings while in a liquid form. Most problematic is that many of these liquid materials quickly form solids when exposed to oxygen and/or water. Thus, any exposure to the air during liquid delivery of these reactants likely will result in the formation of solids, which clog the lines leading to the burners and the small orifices of the burners and the burner assemblies themselves. When the orifices become partially clogged, the flame, and thus the soot stream becomes non-uniform and the soot deposition rate suffers. As a result, the liquid delivery system must be shut down so that it can be cleaned. Such cleaning operations typically require partial disassembly of the burner assembly, which results in significant production down time.

In liquid delivery systems, plugging or clogging of the burner assembly orifices is particularly problematic during the start up and shut down stages of the liquid delivery cycle. During these periods, the liquid reactant tends to trickle or sputter out of the injector orifice. This occurs during the start up stage of the liquid delivery cycle before steady state pressure is available, and at the shut down stage of the liquid delivery cycle after steady state pressure is no longer available. These limited pressure stages result in significantly reduced liquid flow rates, which in turn can provide the exposure time necessary for the slow moving liquid to react with the air to form solids. Alternatively, these liquid feedstocks can leak and solidify on the burner face or within the burner head cavity, resulting in increased down time for cleaning or unclogging the burner. Because the liquid feedstocks can react with water in the air almost instantaneously, any amount of slow moving liquid feedstock within the injector or at the injector orifice can result in deposit of solids. The resultant partial plugging degrades burner performance for rate and quality of the soot produced, and complete plugging will stop soot deposition altogether.

There is a need therefore, for a system and method of delivering liquid feedstocks or precursors (hereinafter, "liquid reactants") through a burner assembly to form soot for the manufacture of glass that eliminates the premature solidification of the liquid reactants and therefore the plugging of burner assemblies in liquid delivery systems.

SUMMARY OF THE INVENTION

The present invention is directed to a system and method for delivering liquid reactants to a combustion zone adjacent a burner assembly of a liquid delivery system to produce soot for use in the manufacture of glass. In a liquid delivery system, the liquid reactant, capable of being converted by thermal oxidative decomposition to glass, is introduced directly into the combustion zone of a combustion burner; thereby forming finely divided amorphous soot. The amorphous soot is typically deposited on a receptor surface where, either substantially simultaneously with or subsequent to its deposition, the soot is consolidated into a body of fused glass. The body of glass may then be either used to make products directly from the fused body, or the fused body may be further treated, e.g., by forming an optical waveguide such as by drawing to make optical waveguide fiber as further described in, for example, U.S. patent application Ser. No. 08/574,961 entitled, "Method for Purifying Polyalkylsiloxanes and the Resulting Products", the specification of which is hereby incorporated by reference.

One advantage of the present invention is that the system and method facilitates against "plugging" of the burner assembly orifices and the respective liquid delivery lines feeding those burner assembly orifices. The terms, "plugging" and "plug", as used herein, refer to the effect of solids (formed by the chemical reactions that result from exposing liquid reactants to water, and specifically, water contained in air) that collect on the inner surfaces of the lines leading to the burner assembly and walls of the burner assembly orifices. The collected solids impede or partially impede liquid flow. The system and method of the present invention are particularly well suited for eliminating plugging, and particularly, plugging that typically occurs during periods of transient liquid flow. As used herein, the phrases, "periods of transient liquid flow" and "transient liquid flow conditions" are defined as those times or periods when liquid flow is being increased to achieve steady state flow within the system. Transient liquid flow also includes these times or periods when liquid flow is being decreased from steady state liquid flow and those times or periods when liquid flow is maintained at a rate less than the selected steady state flow rate for soot deposition.

The liquid reactant preferably is prevented from being exposed to air, and thus water contained within air, during periods when the liquid reactant is not being delivered to the combustion zone to form soot. Accordingly, another advantage of the present invention is that elements previously not capable of being delivered as precursors for the formation of soot used to manufacturing glass are now capable of being delivered to form soot having qualities and properties heretofore unknown in the art. Since the liquid reactant does not come in contact with water until desired, and since the liquid precursor is not delivered as a vapor prior to its exposure to the combustion zone, elements selected from groups IA, IIA, IIIA, IIIB, IVA, IVB, VA, VB and the rare earth series of the periodic table of elements are now available to be converted by oxidation or flame-hydrolysis to soot for use in the manufacture of glass preforms.

When soot is being deposited and during other periods of steady state liquid flow, plugging is not generally a concern as the liquid enters the combustion zone before it has time to solidify enroute. However, during transient liquid flow conditions, particularly those times when liquid delivery is started and stopped, the liquid reactant flow rate is greatly reduced and the liquid reactant tends to trickle or sputter out of the liquid exit orifice of the burner assembly. During these conditions, the liquid reactant is available within the lines and within the liquid exit orifice of the burner assembly for reaction to a solid. These solids plug the orifice as well as the lines, and therefore adversely effect the soot deposition rate.

The present invention, however, delivers an evaporative liquid through the lines and burner assembly liquid exit orifice during the transient liquid flow conditions thus removing the liquid reactant from the lines and orifice during periods of reduced liquid flow rate. Because there is no liquid reactant available in the lines and orifice during this time, only the evaporative liquid is available to trickle and sputter. The evaporative liquid simply vaporizes and evaporates from the lines and orifice without leaving behind significant solids to plug the burner assembly.

To achieve these and other advantages, the system of the present invention delivers an evaporative liquid to a combustion zone through a conduit and an injector. Flow through the conduit is selectively controlled and is transitioned from the evaporative liquid to a liquid reactant. The liquid reactant is then delivered to the combustion zone through the conduit and the injector to create soot for use in the manufacture of glass. During this transitioning, a steady state flow of liquid is maintained within the conduit leading to the combustion zone. This can be achieved for example, by first delivering evaporative liquid through the conduit until a flow rate of the evaporative liquid is established which is effective to propel a uniform flow of the evaporative liquid through the conduit and burner assembly without sputtering, or dripping on or in the burner assembly, etc. Consequently, when the flow of liquid reactant is first initiated, a continuous flow rate has already been established within the conduit (i.e., by the evaporative liquid). Moreover, even though a relatively small flow rate of liquid reactant is initially present, the method of the present invention enables the liquid reactant to be propelled through the conduit at a higher speed than would otherwise occur without the aid of the evaporative liquid. When necessary, flow can be transitioned from the liquid reactant back to the evaporative liquid to purge the conduit and injector prior to terminating liquid flow to the combustion zone.

In another aspect, the invention includes a burner assembly for delivering a liquid reactant directly into a combustion zone as an aerosol to create soot for the manufacture of glass, and a dry environment positioned upstream from the burner assembly to house the liquid reactant. A conduit extending from the dry environment to the burner assembly carries the liquid reactant to the combustion zone via a flow control apparatus.

In yet another aspect, an inert gas is introduced into an enclosure to create a dry environment where a liquid reactant is staged. The enclosure includes a conduit for selectively transporting the liquid reactant to a combustion zone through an injector. An evaporative liquid is delivered through the conduit to the combustion zone and thereafter, the evaporative liquid is transitioned to the liquid reactant. The reactant is then delivered to the combustion zone through the conduit and the injector to form soot used in the manufacture of glass. The liquid reactant may then be transitioned to the evaporative liquid, and the evaporative liquid delivered to the combustion zone through the conduit and the injector to purge the system.

Additional features and advantages of the invention will be set forth in the detailed description, which follows, and in part will be apparent from the description, or may be learned by practice of the invention. It will be understood by those skilled in the art that both the foregoing general description and the following detailed description are exemplary and explanatory in nature and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DETAILED DESCRIPTION OF THE PREFERRED EMBODIMENTS

A number of soot collection and soot deposition techniques are employed in the manufacture of glass products. While the present invention is capable of being employed in a number of these techniques, it is particularly well suited for those techniques used to deposit soot on a target to form glass preforms used in the manufacture of optical waveguides, and specifically optical waveguide fibers. During the manufacture of optical waveguide fibers, soot typically is uniformly deposited on or within a target. The collected soot is consolidated into a high purity glass preform and thereafter subjected to further processing steps such as drawing to form a thin fiber capable of carrying and directing light. Accordingly, the present invention will be described in this regard. It will be understood by those skilled in the optical waveguide fiber art, however, that there are other systems and variations of the depicted systems in which the present invention can be incorporated to perform the functions described and claimed herein. Reference will now be made in detail to the present preferred embodiments of the invention, examples of which are illustrated in the accompanying drawings.

Figure 1:
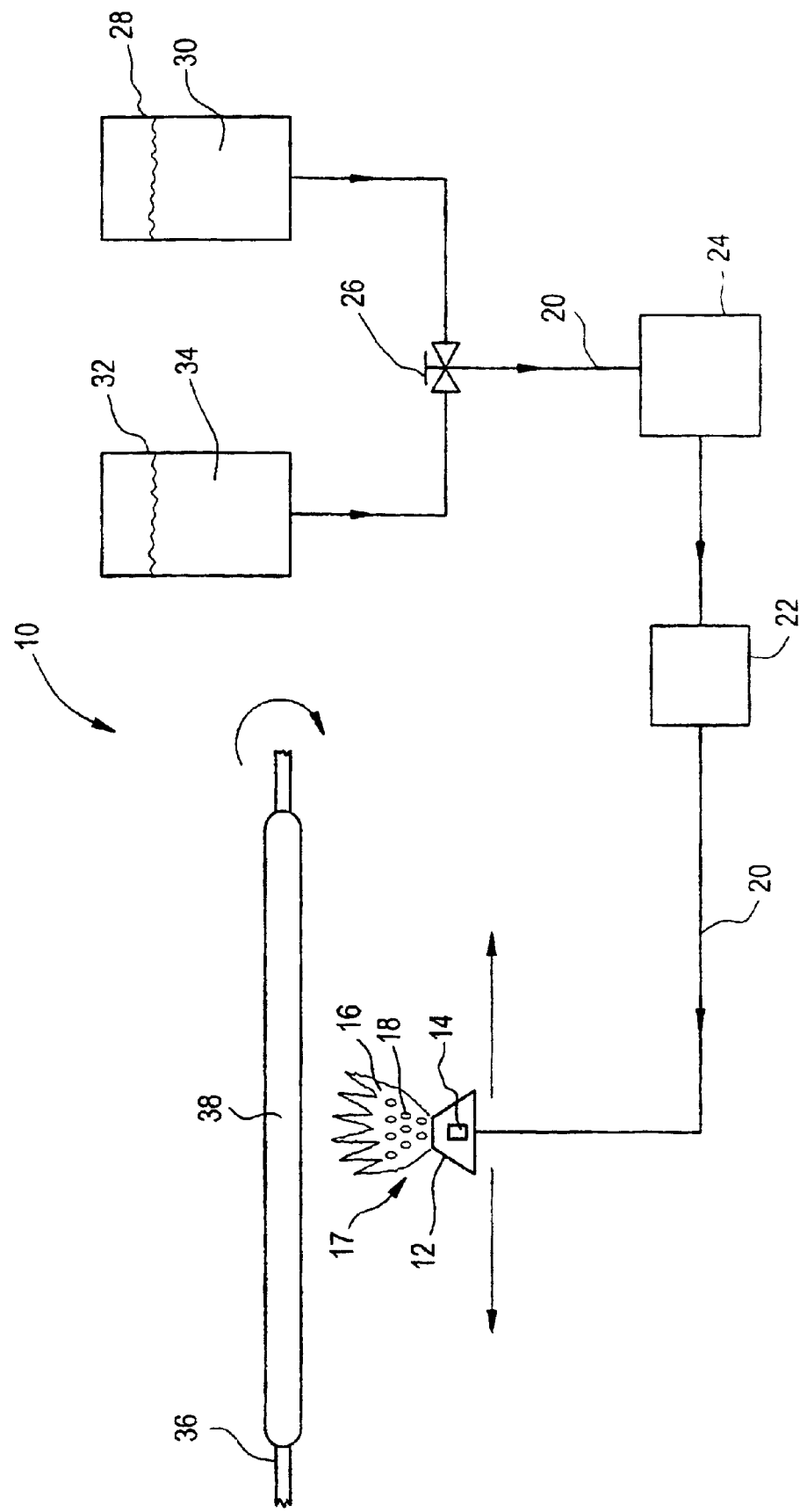
FIG. 1 schematically depicts a first preferred embodiment of the system of the present invention.

A first preferred embodiment of the system for delivering a liquid reactant into a combustion zone to form soot for use in the manufacture of glass is depicted in FIG. 1. The liquid reactant delivery system 10 includes a burner assembly 12 incorporating injector 14 which is capable of delivering liquids to a combustion zone 16 in the form of atomized liquid droplets 18. Burner assembly 12 is preferably an atomizing burner assembly such as a burner assembly disclosed in U.S. patent application Ser. No. 08/767,653, filed Dec. 17, 1996, and entitled "Method and Apparatus for Forming Fused Silica by Combustion of Liquid Reactants"; U.S. patent application Ser. No. 08/903,501, filed Jul. 30, 1997, entitled "Method for Forming Silica by Combustion of Liquid Reactants Using Oxygen"; U.S. patent application Ser. No. 09/089,869, filed Jun. 3, 1998, entitled "Method and Apparatus for Forming Silica by Combustion of Liquid Reactants Using a Heater"; U.S. Provisional Application Serial No. 60/068,255, filed Dec. 19, 1997, entitled "Burner and Method for Producing Metal Oxide Soot"; and U.S. Provisional Application entitled "Method and Apparatus for Forming Soot for the Manufacture of Glass", filed Jul. 31, 1998, the specifications of which are hereby incorporated by reference. However, it will be understood by those skilled in the art that other burner assemblies capable of delivering liquid reactants to a combustion zone in liquid form can be incorporated into the system of the present invention.

Liquid reactant delivery system 10 further includes a liquid reactant 30 and an evaporative liquid 34 capable of being selectively fed to injector 14 of burner assembly 12 through conduit 20. The term "liquid reactant," as used herein means any reactant capable of reacting in a combustion zone to form soot. In a preferred embodiment, the liquid reactant is a glass precursor capable of making glass soot used to manufacture preforms for optical waveguide fibers. Likewise, the term "evaporative liquid," as used herein is defined as a liquid, other than water, capable of evaporating without leaving significant solids behind. Typically, liquid reactant 30 and evaporative liquid 34 are stored in liquid reactant reservoir 28 and evaporative liquid reservoir 32, respectively. Flow control mechanism 26, preferably a 3-way valve, provides selective control of the liquid delivered to conduit 20. The desired quantities of the selected liquid are delivered to injector 14 with a conventional pump 24 and flow meter 22.

In operation, combustion reactants (not shown) are delivered through burner assembly 12 and ignited to form a flame 16 at combustion zone 17. Although not shown, the combustion reactants preferably include, a flame gas, an additional combustion gas, and a shield gas. Typically, the flame gas is a mixture of methane and oxygen, the combustion gas is additional oxygen, and the shield gas is an inert gas such as nitrogen. It will be understood however, that other gases and combination of gases can be used for the combustion reactants delivered through burner assembly 12. Flow control mechanism 26 is positioned to provide flow of evaporative liquid 34 into conduit 20. Evaporative liquid 34 is pumped via pump 24 though flow meter 22 to control the flow rate of evaporative liquid 34 to injector 14. Evaporative liquid 34 is discharged by injector 14 from burner assembly 12 as atomized liquid droplets 18 into combustion zone 17. During the start-up phase of the present invention, evaporative liquid 34 initially trickles or sputters out of burner assembly 12 due to initial low pressure and the corresponding low flow rate in conduit 20. However, once the flow rate through conduit 20 is increased by pump 24, evaporative liquid 34 is uniformly delivered into combustion zone 17 as atomized liquid droplets 18, which are quickly combusted in combustion zone 16 without leaving significant solids behind to plug burner assembly 12.

Once a steady state liquid flow rate is attained (i.e., a flow rate at which transitioning can occur without significant build-up occurring caused by solidification of liquid reactant), flow control mechanism 26 transitions liquid flow from evaporative liquid 34 to liquid reactant 30. In a preferred embodiment, a steady state liquid flow rate is a flow rate substantially equal to that employed during soot deposition and achieved within the conduit prior to the transitioning step. As flow of liquid reactant 30 is increased, flow of evaporative liquid 34 is decreased, thus a "bumpless" transition occurs. The term "bumpless" as defined herein, means that there are no gaps between the liquids delivered through conduit 20. Instead, the flow rate through conduit 20, burner assembly 12, and into combustion zone 17, remains constant during transition. Shortly after flow into conduit 20 is exclusively liquid reactant 30, evaporative liquid 34 remaining within conduit 20 is discharged into combustion zone 17 followed immediately by liquid reactant 30 which is combusted to form soot. Burner assembly 12 is directed toward rotating mandrel 36 and soot 38 is deposited on rotating mandrel 36. Although soot 38 is shown in FIG. 1 as being deposited on rotating mandrel 36 by traversing burner assembly 12 back and forth along the exterior length of rotating mandrel 36, soot deposition can be achieved by alternative methods, e.g. by moving the mandrel back and forth with respect to the burner assembly.

Once the desired quantity of soot is deposited on rotating mandrel 36, liquid flow is transitioned from liquid reactant 30 to evaporative liquid 34 via flow control mechanism 26. Burner assembly 12 is preferably directed away from rotating mandrel 26 so that when the remainder of liquid reactant 30 in conduit 20 is delivered to combustion zone 17 evaporative liquid 34 discharged immediately thereafter is combusted away from rotating mandrel 36. Flow control mechanism 26 is can then be engaged to prevent all liquid flow into conduit 20. Once the remainder of evaporative liquid 34 in conduit 20 is delivered through burner assembly 12 to combustion zone 17, the trickle flow from injector 14 evaporates cleanly and the burner assembly flame is turned off. Since evaporative liquid 34 is the last liquid discharged from burner assembly 12, there is no liquid reactant 30 available to react with water in the air to form solids in the orifices (not shown) of burner assembly 12 or in conduit 20 adjacent burner assembly 12. Accordingly, cleaning of burner assembly 12 is not necessary prior to additional runs of the liquid delivery system 10 of the present invention.

Figure 2:
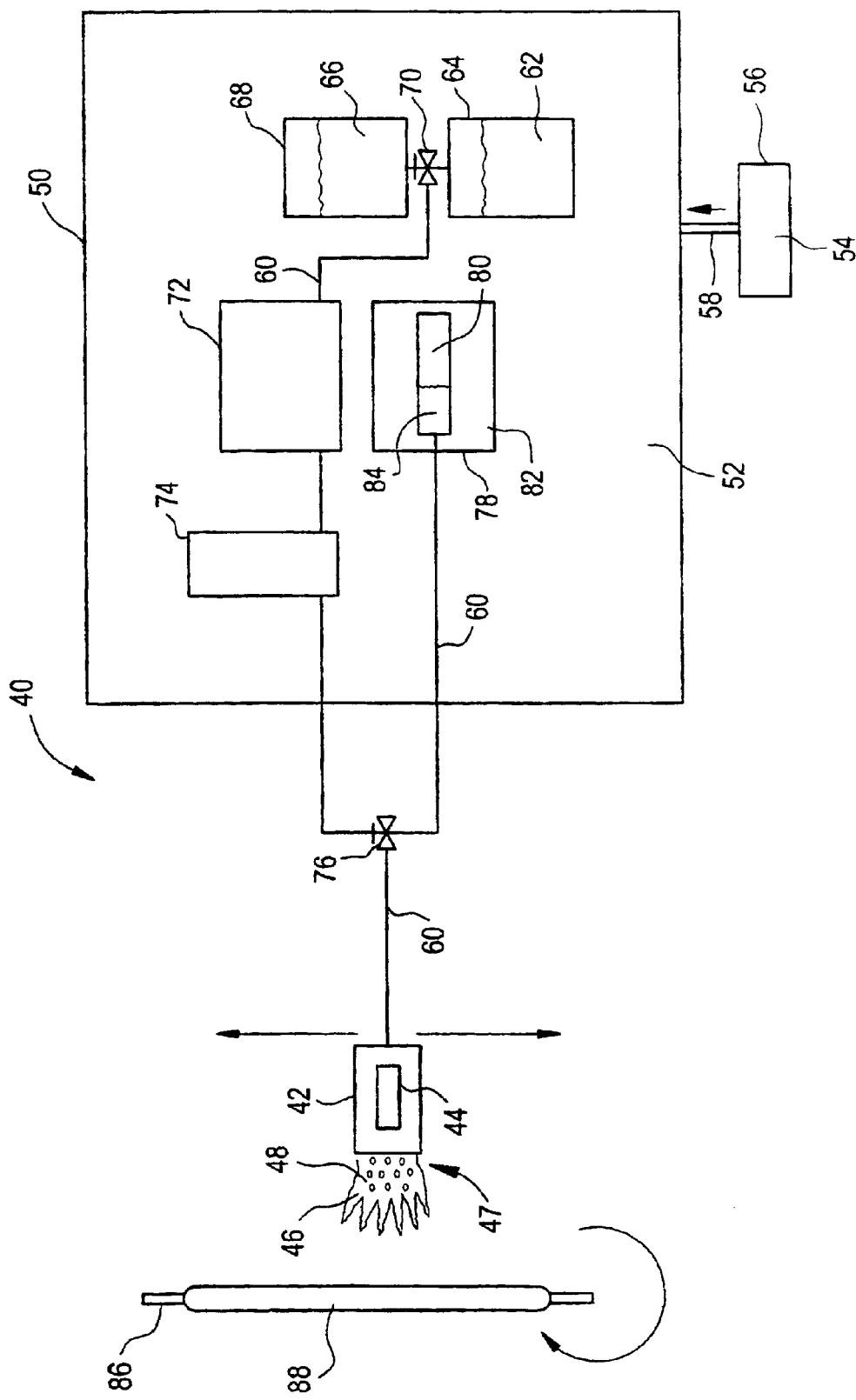
FIG. 2 schematically depicts a second preferred embodiment of the system of the present invention.

A second preferred embodiment of the system and method for delivering liquid reactants 40 is schematically depicted in FIG. 2. The second preferred embodiment is particularly well suited for the delivery of one or more dopants, either independently of, or together with other liquid reactants. It will be understood by those skilled in the art, however, that dopants can also be delivered using the first preferred embodiment of the system and method of the present invention 10. When delivered using liquid reactant delivery system 10, dopants can be mixed with liquid reactants 30 in a single reservoir to form a liquid reactant having the desired proportions of liquid reactants 30 and dopants. The liquid reactant can then be delivered in a single step to the combustion zone where it is reacted to form uniformly doped soot In this way, the soot can be formed without a separate doping step. As will be described in detail below, there are practical and economical advantages to delivering dopants using the second preferred embodiment of the present invention, particularly when the optical properties of the fiber to be formed are to be altered during laydown.

Liquid reactant delivery system 40 includes a burner assembly 42 having an injector 44. It also includes a liquid reactant reservoir 64 and an evaporative liquid reservoir 68 containing, respectively, liquid reactant 62 and evaporative liquid 66. Like the first embodiment of the present invention, evaporative liquid 66 and liquid reactant 62 are selectively delivered through conduit 60 to injector 44 via flow control mechanism 70. Pump 72 and flow meter 74 control the flow rate of the selected liquid through conduit 60.

In addition, liquid reactant delivery system 40 includes an enclosure 50, an inert gas source 56, a syringe pump 78, and an additional flow control mechanism 76. Like flow control mechanism 70, additional flow control mechanism 76 is preferably a 3-way valve capable of transitioning liquid flow into conduit 60 among a number of liquid sources. One preferred syringe pump 78 is the "Harvard Syringe Pump", model #44, manufactured by Harvard Inc. of Holliston, Mass. Although other delivery devices would be acceptable alternatives, syringe pump 78 includes a syringe 80 and metering device 82 that are particularly well suited for delivering materials in precise quantities. This makes syringe pump 78 ideal for delivering dopants for use in the manufacture of optical waveguides. Inert gas source 56 is preferably a dispenser capable of delivering an inert gas 54 into enclosure 50 through passageway 58.

Liquid reactant reservoir 64, evaporative liquid reservoir 68, and preferably syringe pump 78, are all housed or staged within enclosure 50. Inert gas 54 is delivered through passageway 58 into enclosure 50 to displace all water residing therein and thereby create a dry environment 52. As used herein, the term "dry environment" means an environment essentially free of water, i.e., less than an amount of water which would have an adverse effect on the liquid reactant(s) contained within the reservoir(s). Although not required, it is preferred that inert gas 54 be continuously fed into and exhausted from enclosure 50. Among other benefits, continuously delivering inert gas 54 into enclosure 50 prevents water containing air from entering enclosure 50 if a leak develops therein. Dry environment 52 provides ideal conditions for working with liquid reactant 62 and dopant 84. Because there is essentially no water within the enclosure 50 when it is provided with inert gas 54, solidification of liquid reactant 62 and dopant 84 is avoided. Although enclosure 50 can be any size, it is preferably a glove box provided with a pair of arm length rubber gloves which enable an operator of liquid reactant delivery system 40 to access the various liquids staged therein. In this way, the operator can change the solutions to deliver a different liquid reactant 62 and/or dopant 84 as desired without exposing liquid reactant 62 and dopant 84 to water. Accordingly, solutions can be changed between runs without having to clean and/or purge the system. Syringe pump 78 offers the additional advantage of having interchangeable syringe 80. Thus, several syringes 80 containing different dopants 84 can be pre-positioned within enclosure 50 so that numerous runs can be made before additional dopants 84 must be introduced and staged within enclosure 50.

In one embodiment, inert gas 54, such as argon, helium or dry air (comprising approximately 75% nitrogen and 25% oxygen, but no water), but preferably nitrogen, is introduced into enclosure 50 to create dry environment 52 therein. Liquid reactant 62, and if desired dopant 84 are staged within enclosure 50 for subsequent delivery through injector 44 of burner assembly 42. Evaporative liquid 66 is also typically housed within enclosure 50 so that it does not absorb water from the air outside of the enclosure, but can be maintained outside of enclosure 50, provided it is not exposed to air or other water sources. After combustion reactants (not shown) are delivered to burner assembly 42 to create flame 46 at combustion zone 47, flow control mechanism 70 is positioned to deliver evaporative liquid 66 into conduit 60. Evaporative liquid 66 is metered through pump 72 and flow meter 74 to additional flow control mechanisms 76, which passes evaporative liquid 66 to injector 44 and into combustion zone 47 as atomized liquid droplets 48. Once steady state flow of evaporative liquid 66 is attained, flow control mechanism 70 is engaged to transition flow to liquid reactant 62. Again, the transition is "bumpless", and once the evaporative liquid 66 has cleared from conduit 60, burner assembly 42 is directed toward rotating mandrel 86. Liquid reactant 62 is discharged from burner assembly 42 as atomized liquid droplets 48 which are reacted in combustion zone 47 to form soot 88 which is deposited on rotating mandrel 86. When desired, dopant 84 can be selectively metered through conduit 60 via additional flow control mechanism 76 and into combustion zone 47 to produce doped soot.

Once the desired quantity of soot 88 is deposited on rotating mandrel 86, burner assembly 42 is directed away from rotating mandrel 86 and liquid flow into conduit 60 is transitioned to evaporative liquid 68 via flow control mechanism 70. Once liquid reactant 62 has cleared conduit 60, flow of evaporative liquid 66 is terminated and the combustion flame 46 is turned off. Because evaporative liquid 66 is the last liquid to exit burner assembly 42, the trickled liquid merely evaporates and no reactant is present in burner assembly 42 for reaction to solids. Thus, plugging the burner assembly 42 and conduit 60 adjacent burner assembly 42 is avoided.

In both the first and second preferred embodiments of the present invention, a preferred liquid reactant 30, 62 for delivery through liquid reactant delivery system 10 and 40, respectively, is a silicon alkoxide such as tetraethoxysilane or tetramethoxysilane. More preferably, liquid reactant 30, 62 is a metal alkoxide such as titanium (IV) propoxide, germanium (IV) ethoxide, potassium butoxide (made soluble with a suitable organic solvent, such as ethylene glycol monomethylether) and other metal alkoxides known in the art. Most preferably liquid reactant 30, 62 is a siloxane, and specifically an organosiloxane such as octamethylcyclotetrasiloxane. It will be understood by those skilled in the art, however, that liquid reactant 30, 62 can be combinations of the above-listed compounds, made soluble with a suitable organic solvent, such as ethylene glycol monomethylether.

The preferred dopants 84 delivered by syringe pump 78 of liquid reactant delivery system 40 are ketonates, alkoxides, acetates, β-diketonates, or fluoro-β-iketonates of praeseodynium, holmium, and thulium dissolved in a suitable organic solvent such as ethylene glycol monomethylether. The most preferred dopant 84, however, is erbium, which is preferably delivered in liquid solution as a β-diketonate or fluoro-β-diketonate. It will be understood by those skilled in the art that other rare earth elements, as well as other elements having properties beneficial for optical waveguides can be delivered by syringe pump 78. Although not shown in liquid reactant delivery system 10 of FIG. 1, it will also be understood by those skilled in the art that the above-mentioned elements can also be delivered through liquid reactant delivery system 10 using a syringe pump or other suitable delivery device, provided the selected dopant solution is not exposed to water.

Evaporative liquid 34, 66 delivered through liquid reactant delivery system 10 and liquid reactant delivery system 40, respectively, can be organic nitrogen-containing solutions such as amides, amines, and nitrites, but are more preferably organic oxygen-containing solutions. Ketones such as acetone, acetates such as ethylacetate, ethers such as diethylether, and glycols such as ethylene glycol and ethylene glycol monomethylether are representative examples of such organic oxygen-containing solutions. More preferably, alcohol such as ethanol, methanol and propanol are the organic oxygen-containing solutions delivered as evaporative liquids 34 and 66, with ethanol and 1-propanol being the most preferred solutions.

It will be apparent to those skilled in the art that several of the organic oxygen-containing liquids and organic nitrogen-containing liquids described above can be mixed with organosiloxanes, metal alkoxides, siloxanes, silicon alkoxides, metal acetates, metal β-diketonates, metal ketonates, rare earth acetates, ketonates, alkoxides, β-diketonates and/or fluoro-β-diketonates, in a single reservoir, for delivery as liquid reactants 30 and 62. When combusted, these solutions form various silicon-oxide and metal-oxide soots that can be captured and used to form optical waveguides having distinct properties. Examples of such organic oxygen-containing liquids are ketones, alcohols, glycols, esters, β-diketones, and carboxylic acids. Examples of such organic nitrogen-containing liquids are amides, amines, nitrites and imines.

It will be apparent to those skilled in the art that various modifications and variations can be made in the system and method for plug-free delivery of liquid reactants through a burner assembly of the present invention without departing from the spirit or scope of the invention. Thus, it is intended that the present invention cover the modifications and variations of this invention provided they come within the scope of the appended claims and their equivalents. In addition, the corresponding structures, materials, acts and equivalents of all means or step plus function elements in the claims below are intended to include any structure, material, or acts for performing the function in combination with other claimed elements as specifically claimed herein.

We claim:

1. A method of forming soot for use in the manufacture of glass while maintaining a plug free liquid delivery system, said method comprising the steps of:
    a) selectively delivering an alkoxide liquid reactant and a nonatomized evaporative liquid to a combustion zone through a common conduit;
    b) transitioning between said liquid reactant and said evaporative liquid during said selectively delivering step; and
    c) reacting said liquid reactant in said combustion zone to form the soot.

2. The method as claimed in claim 1 further comprising the step of:
    d) evaporating said evaporative liquid in said combustion zone during transient flow conditions.

3. A method of depositing soot to make a glass preform for optical fibers in accordance with claim 2 wherein step d) comprises forming a preform from said soot.

4. The method as claimed in claim 3 further comprising the step of delivering a dopant into said combustion zone through said conduit to create doped soot.

5. The method as claimed in claim 4 wherein said dopant comprises erbium.

6. The method as claimed in claim 1 wherein step c) comprises the step of simultaneously decreasing flow of said evaporative liquid while increasing flow of said liquid reactant.

7. The method as claimed in claim 6 wherein the step of decreasing flow of said evaporative liquid while increasing flow of said liquid reactant includes the step of activating a valve.

8. The method as claimed in claim 1 wherein step c) comprises the step of simultaneously increasing flow of said liquid reactant while decreasing flow of said evaporative liquid.

9. The method as claimed in claim 1 wherein step a) includes the step of selectively delivering said liquid reactant and said evaporative liquid through an atomizing burner assembly connected to said conduit.

10. The method as claimed in claim 9 wherein said transitioning step is effective to prevent deposits of solids in ear on said atomizing burner assembly or said conduit.

11. The method as claimed in claim 1 wherein said transitioning step occurs in a manner effective to prevent the premature reaction of said liquid reactant with air.

12. The method as claimed in claim 1 wherein said evaporative liquid comprises an organic oxygen-containing compound or organic nitrogen-containing compound.

13. The method as claimed in claim 1 wherein said evaporative liquid comprises an organic oxygen-containing compound selected from the group consisting of alcohols, β-diketones, ketones, esters, ethers, glycols, and amides.

14. The method as claimed in claim 1 wherein said liquid reactant comprises a glass precursor capable of making glass soot used to manufacture preforms for optical waveguide fibers.

15. The method as claimed in claim 1 further comprising the steps of:

staging said liquid reactant and said evaporative liquid in an enclosure; and introducing an inert gas into said enclosure.

16. The method as claimed in claim 15 wherein the step of introducing an inert gas into said enclosure comprises the step of continuously feeding said inert gas into said enclosure in an amount which is sufficient to maintain a dry environment.

17. The method as claimed in claim 15 wherein said inert gas comprises nitrogen.

18. The method as claimed in claim 15 wherein said inert gas comprises argon.

19. The method as claimed in claim 1 wherein the transitioning step occurs during steady state liquid flow.

* * * * *